United States Patent [19]
Nakagawa et al.

[11] Patent Number: 5,198,174
[45] Date of Patent: Mar. 30, 1993

[54] METHOD FOR PRODUCING A HOLLOW PLASTIC PRODUCT HAVING A RADIALLY EXTENDING PORTION

[75] Inventors: Tatsuya Nakagawa, Matsudo; Yasuo Ezaki, Nitta, both of Japan

[73] Assignee: Excell Corporation, Chiba, Japan

[21] Appl. No.: 818,949

[22] Filed: Jan. 10, 1992

[51] Int. Cl.5 .................. B29C 49/04; B29C 49/20
[52] U.S. Cl. .................... 264/512; 264/513; 264/515; 264/534; 425/112; 425/113; 425/127; 425/525; 425/532
[58] Field of Search .......... 264/513, 516, 512, 515, 264/531, 534, 259; 425/525, 112, 113, 127, 129.1, 532, 522

[56] References Cited

U.S. PATENT DOCUMENTS

| | | | |
|---|---|---|---|
| 3,917,789 | 11/1975 | Heisler | 264/513 |
| 4,170,623 | 10/1979 | Dubois et al. | 264/534 |
| 4,713,207 | 12/1987 | Udell et al. | 264/516 |
| 4,946,368 | 8/1990 | Masumoto | 425/525 |
| 5,013,515 | 5/1991 | Aoki | 264/513 |
| 5,057,266 | 10/1991 | Belcher | 264/513 |
| 5,089,208 | 2/1992 | Nakamura et al. | 264/513 |

FOREIGN PATENT DOCUMENTS

| | | | |
|---|---|---|---|
| 60-147319 | 8/1985 | Japan | 264/516 |
| 61-100433 | 5/1986 | Japan | 264/531 |
| 63-242723 | 10/1988 | Japan | 264/534 |
| 1122516 | 8/1968 | United Kingdom | 264/513 |

Primary Examiner—Jan H. Silbaugh
Assistant Examiner—Catherine Timm
Attorney, Agent, or Firm—Skjerven, Morrill, MacPherson, Franklin & Friel

[57] ABSTRACT

A method for producing a plastic product including an axially extending portion, such as a duct or pipe, and a radially extending portion, such as a flange or bracket. A parison is placed in a first mold cavity defined in a mold and blow molded to form the axially extending portion, and then a movable mold segment is moved to a retracted position to define a second mold cavity adjacent to a part of an outer peripheral surface of the axially extending portion thus formed. Then, a second molted plastic material is supplied into the second mold cavity and the movable mold segment is again moved to another predetermined position to pressurize the second plastic material to thereby form a radially extending portion. The resulting hollow plastic product is extremely high in structural integrity between the axially and radially extending portions.

11 Claims, 16 Drawing Sheets

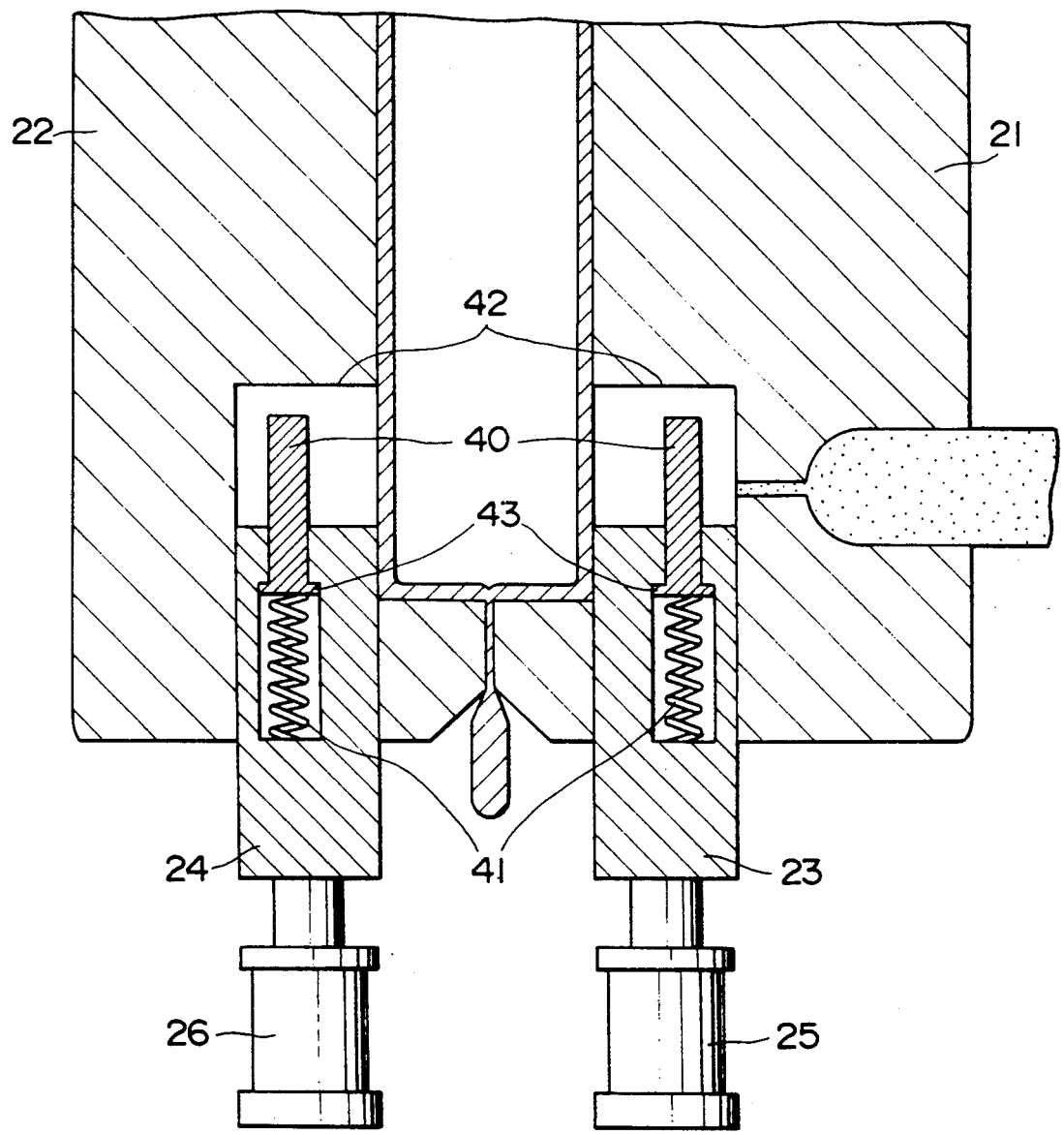

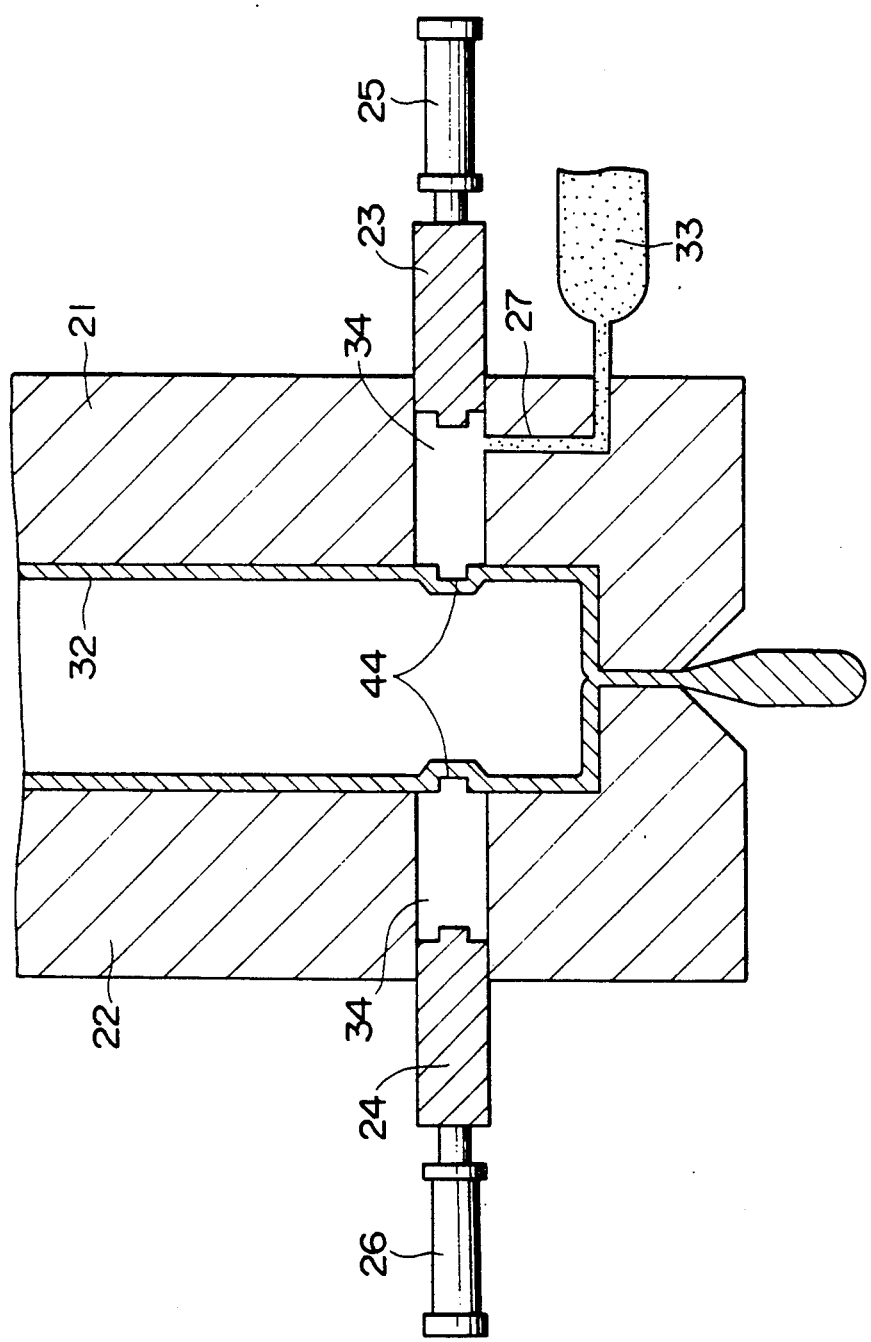

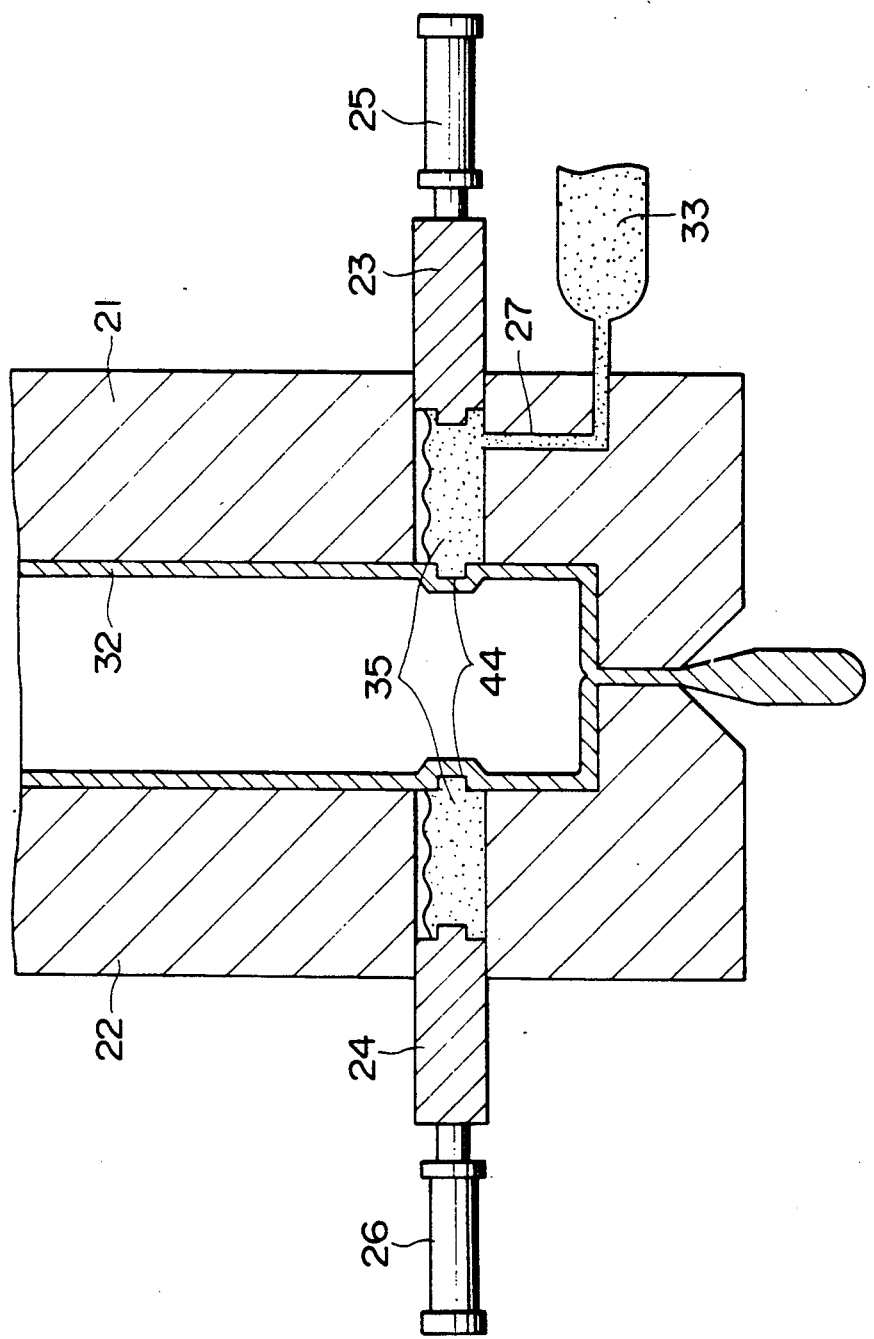

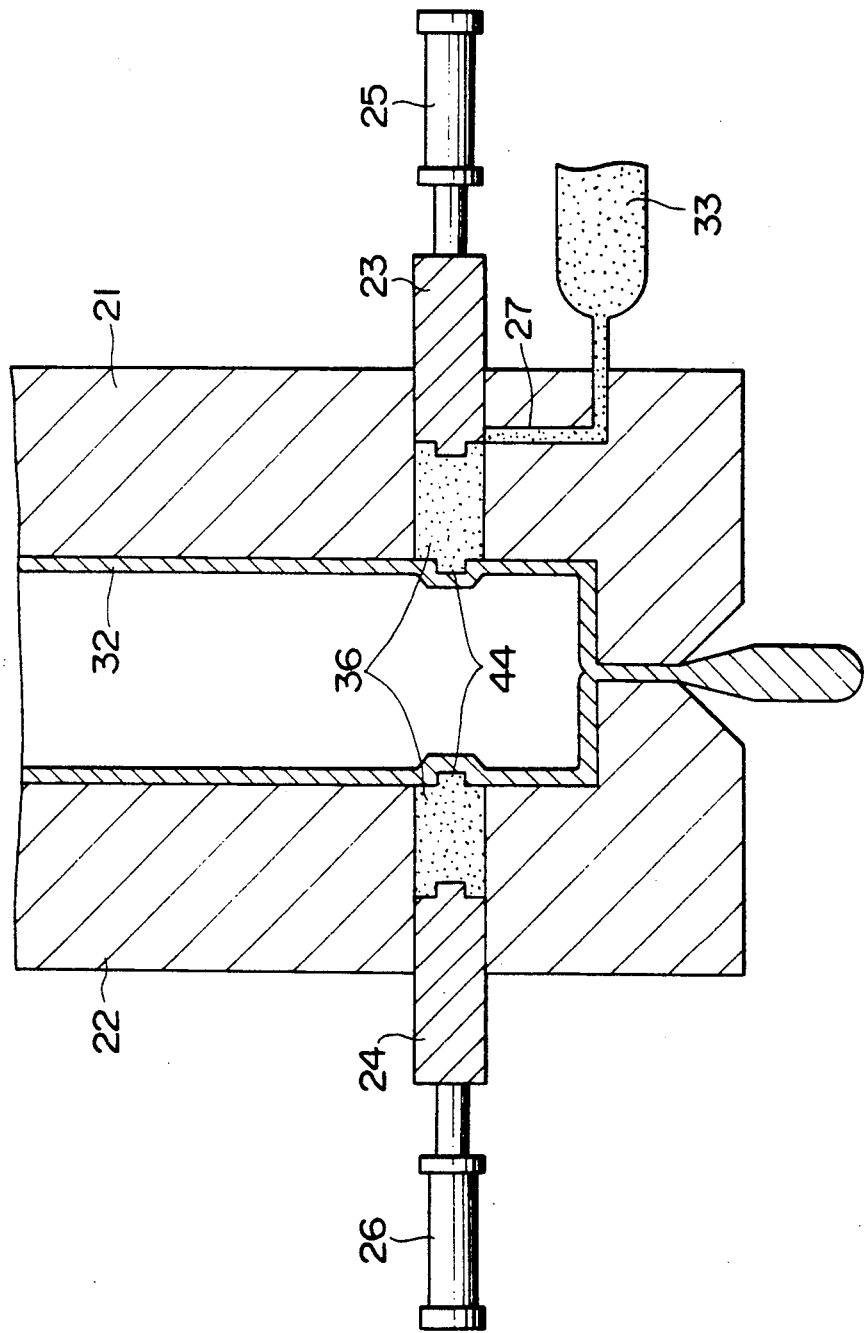

5,198,174

METHOD FOR PRODUCING A HOLLOW PLASTIC PRODUCT HAVING A RADIALLY EXTENDING PORTION

BACKGROUND OF THE INVENTION

1. Field of the Invention

This invention generally relates to a method for producing a hollow plastic product and the resulting structure, and, in particular, to a method for producing a hollow plastic product of any desired shape having a radially extending portion, such as a flange or bracket, and the resulting structure. A hollow plastic product resulting from the present method includes various ducts, pipes and tubes for use in automobiles, in particular in engine rooms thereof, and for use in various home appliance and industrial goods for flowing gas and liquid, such as water and oil.

2. Description of the Prior Art

Typically, a blow molding method is used for producing hollow plastic ducts, pipes and tubes. However, use may also be made of an injection method or an extrusion method for that purpose. The blow molding method is most advantageous in producing a hollow plastic product since the degree of freedom is very high in designing such a hollow plastic product. However, if it is desired to produce a hollow plastic product including an integrated radially extending portion, such as a flange or bracket, the blow molding method is not so easy to use.

For example, if a hollow plastic product having a flange at its end as shown in FIG. 1 were to be produced by the blow molding method from the same parison in one step, the resulting structure would become as illustrated in FIG. 2. That is, in FIG. 2, the shape of an intended flange is indicated by the dotted line 3. However, since the parison 1 is inflated by the pressurized gas supplied therein, that portion of the parison 1 that is located in a flange defining cavity section of a mold 2 is expanded radially so that an undesirably thin portion will be formed at a corner 4, and the resulting flange is undesirably thinner than intended. Thus, it is almost impossible to form a radially extending portion, such as a flange or bracket, integrally with a tubular portion at the same time by the blow molding method.

Under the circumstances, it is conceivable to use an insert blow molding method in which a radially extending portion, such as a flange or bracket, is formed by an injection method in advance, and, then, such a prefabricated element is used as an insert element in the blow molding method. That is, such an insert element is inserted into a corresponding recess defined in a mold cavity before applying a parison into the mold cavity. And, such an insert element is integrated in the resulting blow molded plastic product when a pressurized gas is injected into the parison. However, in this method, since difficulty may be encountered in placing an insert element, there is a limit in the degree of freedom in designing, and, moreover, the joint between the insert element and the blow-molded portion is not very strong and thus rather unreliable.

Another approach would be to use a post-welding method in which both of a radially extending portion, such as a flange or bracket, and a tubular portion are fabricated separately in advance, and, then, these separate elements are combined together by welding, for example by fusing them together. In this case, however, the process tends to be complicated and the joint between the radially extending portion and the tubular portion is rather unreliable.

The injection molding method can be advantageously used to form a flange. However, the injection molding method is not easy to use in producing a tubular portion of a hollow plastic product. When a tubular portion is to be produced by the injection molding method, use is typically made of a sliding core. As a result, the shape of such a tubular portion is necessarily limited to a one dimensional or straight shape and a tubular portion whose center axis varies two or three dimensionally cannot be produced.

In order to cope with this situation, there has been proposed a melting core method which allows to produce a hollow plastic product having an arbitrarily shaped tubular portion and/or a radially extending portion, such as a flange or bracket. In accordance with this melting core method, a meltable core made of an alloy having a low melting point commensurate in shape with a desired tubular portion is set in an injection mold cavity and a molten plastic material is injected into the cavity. Thereafter, heat is applied to have the meltable core melted away to thereby leave the molded tubular portion. In this manner, according to this melting core method, a hollow plastic product of any desired shape and/or having a radially extending portion can be manufactured. However, since use must be made of a metal alloy which can be melted at a relatively low temperature, there are various problems associated with this method.

Furthermore, the extrusion method is suitable for producing straight hoses and tubes, but this method cannot be used in producing a hollow plastic product having a radially extending portion, such as a flange or bracket.

SUMMARY OF THE INVENTION

In accordance with the present invention, there is provided a method for producing a hollow plastic product having a radially extending portion, such as flange, bracket or the like. Briefly stated, in accordance with the present invention, a parison of a first plastic material is placed in a first cavity, which defines a tubular portion of a desired hollow plastic product, of a mold and then a pressurized gas is introduced into the interior of the parison so that the parison is inflated and shaped in compliance with the shape of the first mold cavity. Thereafter, a second cavity, which defines a radially extending portion of the desired hollow plastic product, is formed in the mold adjacent to a part of an outer peripheral surface of the parison thus molded. Then, a second plastic material is supplied into the second cavity and the second plastic material thus supplied is pressurized to thereby have the second plastic material integrated with the first plastic material in a desired shape.

Preferably, the first and second plastic materials are of the same kind. The second cavity is preferably defined by moving a movable part of the mold from its advanced position to its retracted position. Preferably, the step of pressuring the second plastic material is carried out by moving the movable part to a predetermined position from its retracted position. The predetermined position is preferably an intermediate position between the advanced and retracted positions. The movable part may include an irregularly shaped section at its surface which defines a part of the first cavity so that a physically engaged structure may be provided at a junction between the tubular and the radially extending portions. In a preferred embodiment, the movable part is provided with at least one pin which is retractable and normally biased to its projected position by a spring, and the pin extends into the second cavity to form a mounting hole in the radially extending portion when molded. The first cavity may have any desired shape, and its center axis may extend straight or bent two dimensionally or three dimensionally.

Therefore the resulting hollow plastic product having a radially extending portion, such as a flange, bracket or the like, has a structure high in structural integrity and strength. Since the tubular portion of such a hollow plastic product is manufactured by a blow molding method, the tubular portion may take any desired shape, straight or bent two dimensionally or three dimensionally or a combination thereof. Since the radially extending portion is manufactured by a pressure molding method immediately after the formation of the tubular portion in the same mold, the joint between the tubular and radially extending portions is extremely strong and reliable. Moreover, since the radially extending portion is produced subsequent to the formation of the tubular portion, the radially extending portion may be formed to any desired shape and size.

It is therefore a primary object of the present invention to provide a novel method for producing a hollow plastic product having a radially extending portion, and its resulting structure.

Another object of the present invention is to provide an improved method for manufacturing a hollow plastic product of any desired shape using both blow and pressure molding methods, and its resulting structure.

A further object of the present invention is to provide an improved method for producing, with high efficiency and reliability, a hollow plastic product having a tubular portion and a radially extending portion which extends from the tubular portion radially.

Other objects, advantages and novel features of the present invention will become apparent from the following detailed description of the invention when considered in conjunction with the accompanying drawings.

BRIEF DESCRIPTION OF THE DRAWINGS

FIG. 7 is a schematic illustration showing in cross sectional view an apparatus constructed in accordance with another embodiment of the present invention to carry out the present method for producing a hollow plastic product having a flange formed with mounting holes;

FIGS. 9a through 9d are schematic illustrations each showing in cross section the status of an apparatus constructed in accordance with a further embodiment of the present invention at each stage of a sequence of steps for producing a hollow plastic product having a tubular portion and a flange portion with a physically engaging structure provided at a junction between the tubular and flange portions.

DESCRIPTION OF THE PREFERRED EMBODIMENTS

Figure 1:
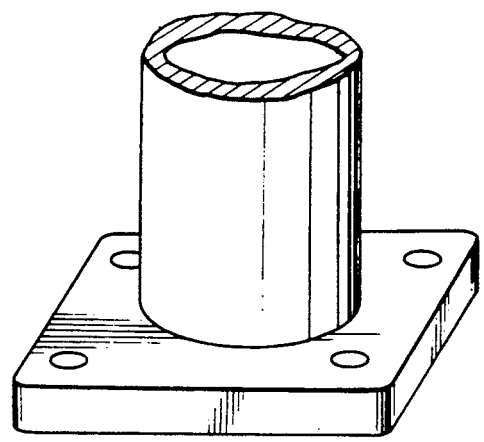
FIG. 1 is a schematic illustration showing in perspective view a hollow plastic product having a flange as a radially extending portion.
Figure 2:
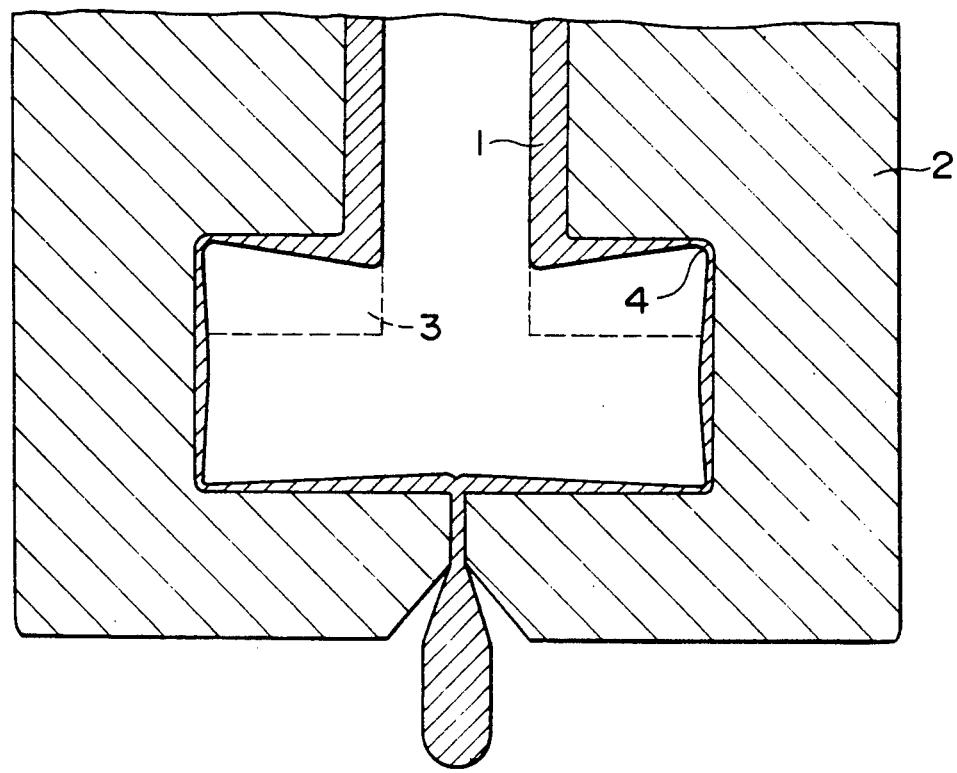
FIG. 2 is a schematic illustration showing in cross section a step of a typical prior art blow molding method for producing a hollow plastic product having a flange.
Figure 3:
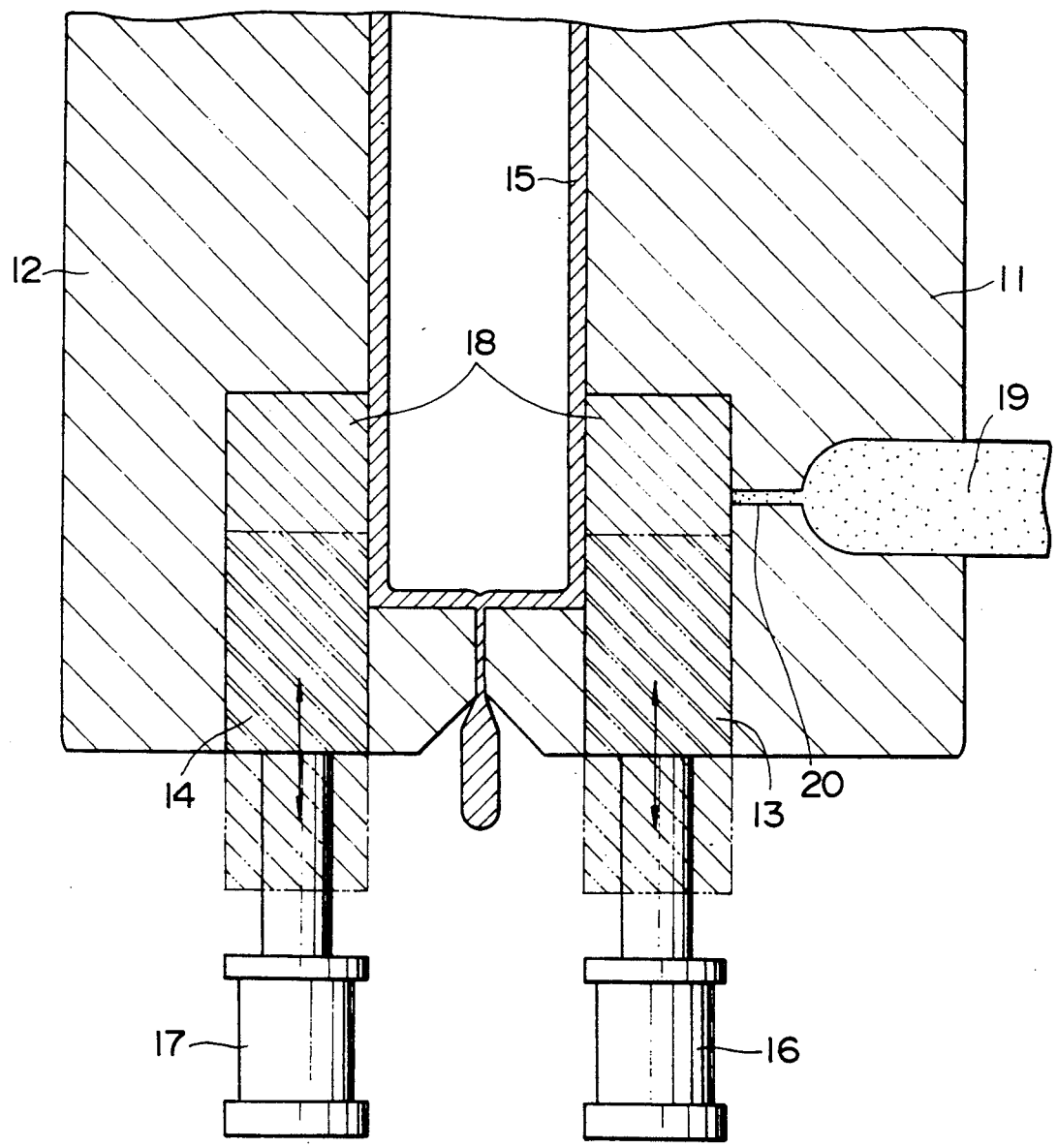
FIG. 3 is a schematic illustration showing in cross section an apparatus constructed in accordance with one embodiment of the present invention for use in practicing the present method.

Referring first to FIG. 3, the principle of the present invention will be described. FIG. 3 schematically illustrates an apparatus which is suitable for use in practicing the method of the present invention. As shown, the apparatus includes a pair of mold halves 11 and 12 which may be moved away from each other or closer together to a mating position as shown horizontally. Each of the mold halves 11 and 12 is formed with a groove at its mating surface, so that when the pair of mold halves 11 and 12 are brought into a mating condition with their mating surfaces in contact with each other as shown in FIG. 3, a first mold cavity is defined by the grooves of these mold halves 11 and 12.

Each of the mold halves 11 and 12 is also provided with a movable mold segment (or sliding core) 13 and 14, respectively, which defines a part of the groove or the first mold cavity. In the illustrated embodiment, each of the movable mold segments 13 and 14 is operatively coupled to an associated cylinder actuator 16 or 17, respectively, so that the movable mold segments 13 and 14 may be moved up and down between an advanced or top position and a retracted or bottom position as indicated by the double arrows. When the movable mold segments 13 and 14 are located at their advanced positions, the first mold cavity is defined and thus a parison may be placed in the first cavity and blowmolded to form a tubular portion of a desired hollow plastic product. After cooling, the tubular plastic portion 15 becomes hardened. Then, the movable mold segments 13 and 14 may be moved to their retracted positions by means of the associated cylinder actuators 16 and 17, respectively. Accordingly, there is defined a second mold cavity 18 adjacent to a part of the outer peripheral surface of the tubular portion 15.

A second molten plastic material 19 is supplied into the second mold cavity 18 through a supply port 20. Upon completion of supply of the second plastic material 19 into the second mold cavity 18, the movable mold segments 13 and 14 are moved to a predetermined position between the advanced and retracted position to apply a compression force to the second plastic material in the second mold cavity 18. Since the volume of the second mold cavity 18 reduces because of this upward movement of the movable mold segments 13 and 14, the second plastic material 19 inside the second mold cavity 18 becomes pressurized so that the second plastic material 19 inside the second mold cavity 18 is shaped to a desired shape, according to the shape of the second mold cavity 18, and, at the same time, integrated with the tubular portion 15.

In this manner, the tubular portion 15 is first formed in the first mold cavity by a blow molding method and then a radially extending portion is formed integrally with the tubular portion 15 in the second mold cavity by a pressure forming method using the same mold halves 11 and 12. Therefore, the resulting hollow plastic product includes the tubular portion 15 defined by the first mold cavity and the radially extending portion defined by the second mold cavity 18. Since the blow molding process and the pressure forming process are carried out one after another without delay using the same mold halves 11 and 12, the resulting hollow plastic product is extremely high in integrity and strength. Moreover, virtually any desired shape may be provided both to the tubular and radially extending portions.

In the embodiment shown in FIG. 3, a flange is formed by the second mold cavity 18 at one end of the tubular portion 15 as a radially extending portion. However, it is to be noted that the principle of the present invention is not limited to such a specific example. For example, a flange may be formed at any other desired location of the tubular portion 15 and any other radially extending portions, such as a bracket, may also be formed. The tubular portion 15 shown in this specific example is one-dimensional or straight with its longitudinal axis; however, the tubular portion 15 may also have any other desired shape.

Figure 4A:
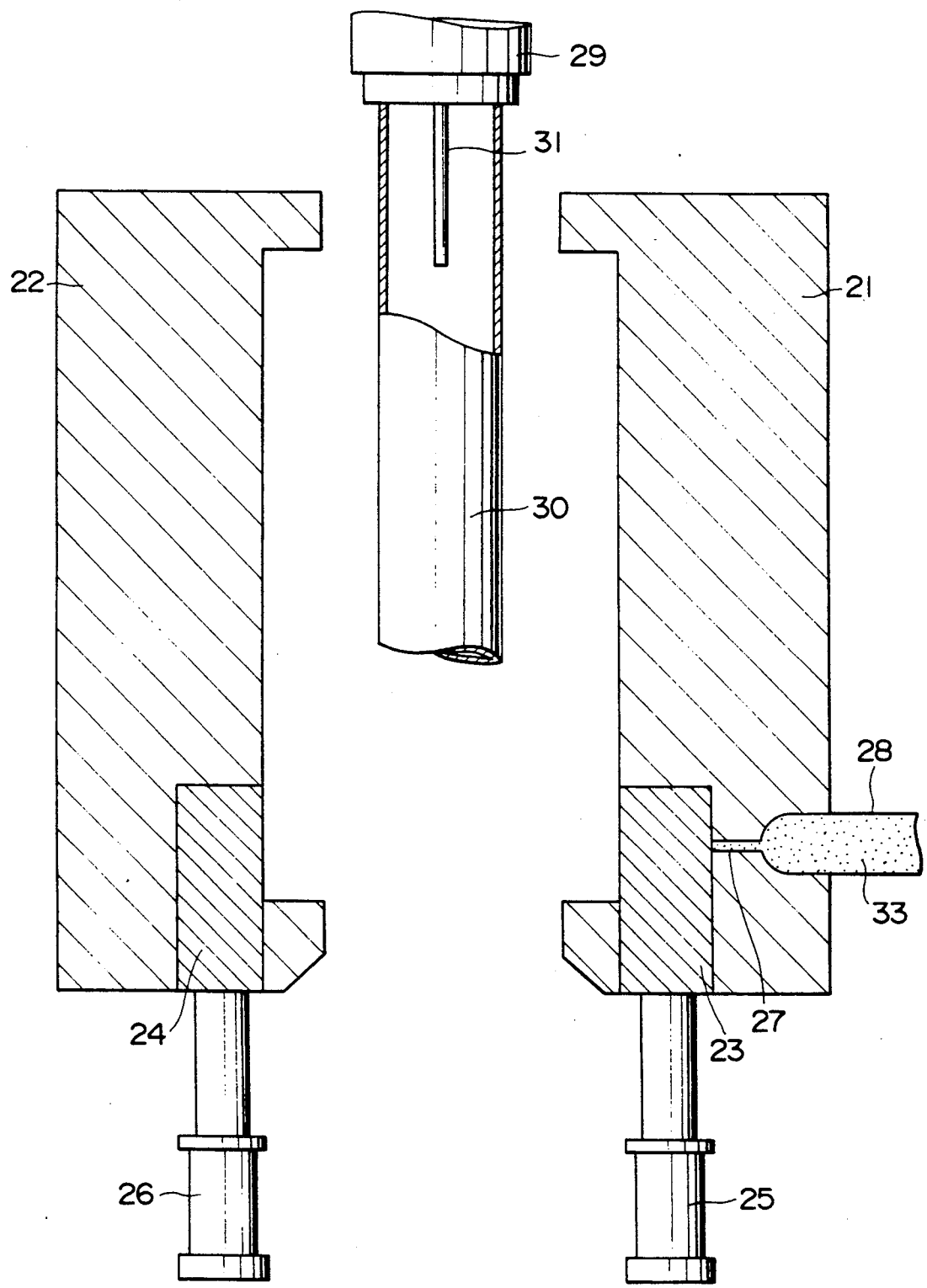
FIGS. 4a through 4e are schematic illustrations each showing in cross section the status of the apparatus of FIG. 3 at each stage of the present method.

Referring to FIGS. 4a through 4e, a process for manufacturing a hollow plastic product including a straight tubular portion and a flange at one end of the tubular portion as a radially extending portion will be described in detail in accordance with one embodiment of the present invention. As shown in FIG. 4a, a pair of mold halves 21 and 22 is at its open position so that they are located separated away from each other horizontally. Each of the mold halves 21 and 22 is provided with a slidable mold segment or core 23 or 24, each of which is operatively associated with a cylinder actuator 25 or 26, respectively. Thus, each of the mold segments 23 and 24 is slidably movable up and down between its advanced or top position as shown in FIG. 4a and its retracted or bottom position. The mold segments 23 and 24 may also be located at any desired location between these two extreme positions by operating the cylinder actuators 25 and 26. The mold half 21 is provided with a supply port 27 which is in communication with a second groove which, in FIG. 4a, is occupied by the slidable mold segment 23 as shown, and the supply port 27 is in communication with a feed line 28 which is connected to a molten plastic material supply source (not shown).

Each of the mold halves 21 and 22 is formed with a groove having a particular shape at its mating surface and the mold halves 21 and 22 are arranged with these grooves facing opposite to each other, so that when the mold halves 21 and 22 are brought to the closed position with their mating surfaces in contact, there is formed a first mold cavity by these grooves. A die head 29 is located above the mold halves 21 and 22, so that a parison 30 comprised of a molten first plastic material discharged out of the die head 29 can be supplied to a location where the mold halves 21 and 22 are located opposite to each other. In the illustrated structure, a pressurized gas supply pin 31 extends downward from the die head 29 along the center line thereof so that the pin 31 extends inside the parison 30 discharged out of the die head 29. The pin 31 may be used for supplying a pressurized gas to the interior of the parison 30 at a first pressure level with the bottom of the parison 30 closed for the purpose of the so-called preblow step, if desired. In some applications, such preblow step may not be required. In addition, the pin 31 may be used for supplying a pressurized gas into the interior of the parison 30 at a second pressure level to carry out blow molding, if desired.

Figure 4B:
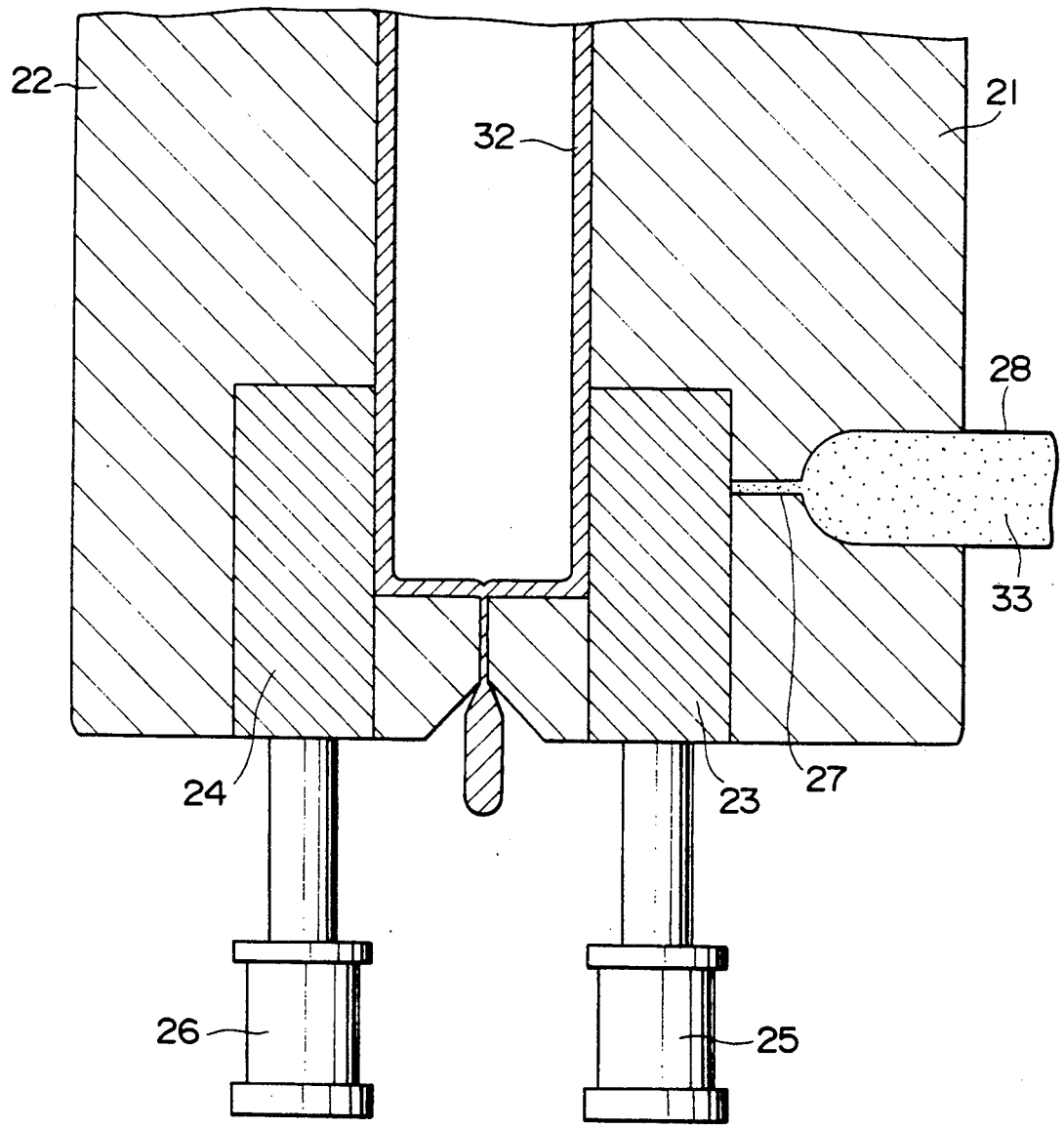

Using the apparatus having the above-described structure, in accordance with the method of the present invention, a parison 30 is first discharged out of the die head 29 into a space where the two mold halves 21 and 22 are oppositely located and spaced apart from each other at an open position as shown in FIG. 4a. Then, after supplying the parison 30 over a sufficient length, the mold halves 21 and 22 are moved closer together to a closed position where the mating surfaces of the mold halves 21 and 22 are in contact to define a first mold cavity as shown in FIG. 4b. In this condition, the parison 30 is closed at the top and bottom ends with the pin 31 stuck into the interior of the parison 30. A pressurized gas is supplied into the interior of the parison 30 thus trapped in the first mold cavity, so that the parison 30 is inflated to be pushed against the wall of the first mold cavity to carry out the shaping of the parison 30. As a result, a tubular portion 32 is obtained from the parison 30.

Figure 4C:
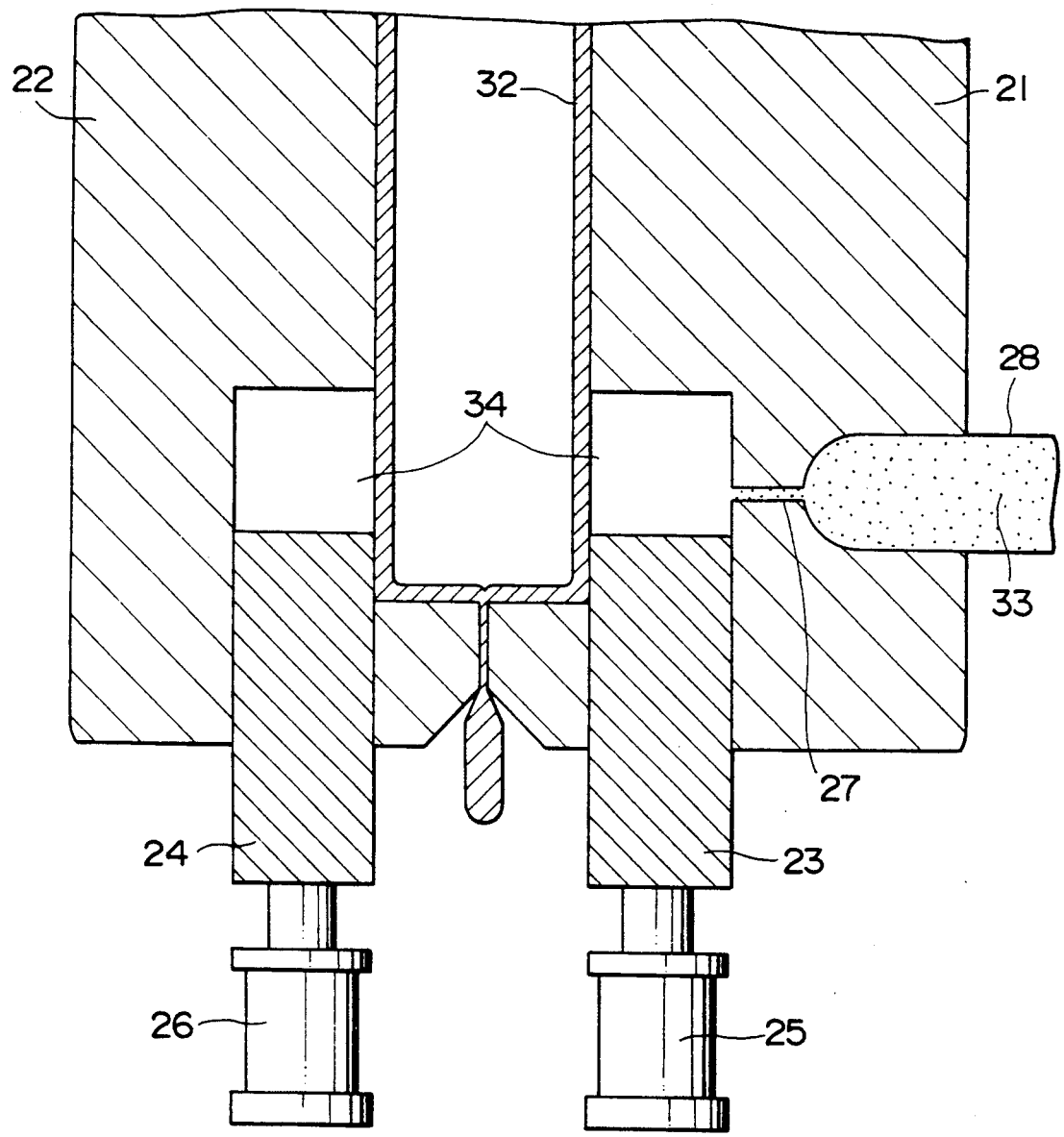

After formation of the tubular portion 32 by a blow molding method as described above, when the tubular portion 32 has become hardened sufficiently due to cooling (for this purpose, a water cooling passage may be provided in the mold halves 21 and 22, if desired), the cylinder actuators 25 and 26 are energized to have the associated slidable mold segments 23 and 24 moved to their retracted positions, respectively, as shown in FIG. 4c. As a result, a second mold cavity 34, annular in shape, is defined around and adjacent to a part of the outer peripheral surface of the tubular portion 32. As shown in FIG. 4c, when the slidable mold segments 23 and 24 are located at their retracted positions as shown in FIG. 4c, the slidable mold segment 23 is located with its top surface lower than the supply port 27, so that the supply port 27 and thus the supply line 28 is set in communication with the second mold cavity 34.

Figure 4D:
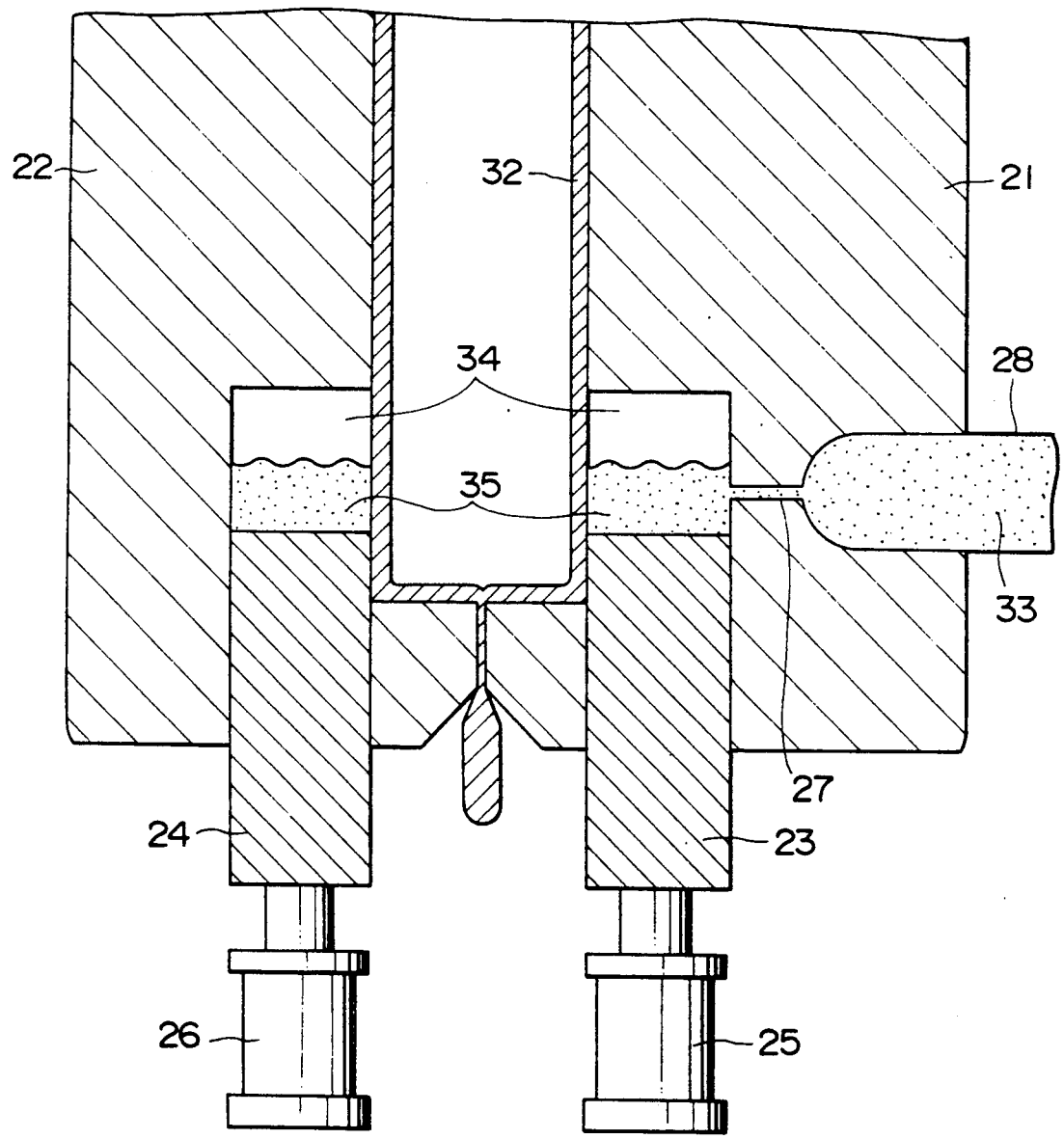
Figure 4E:
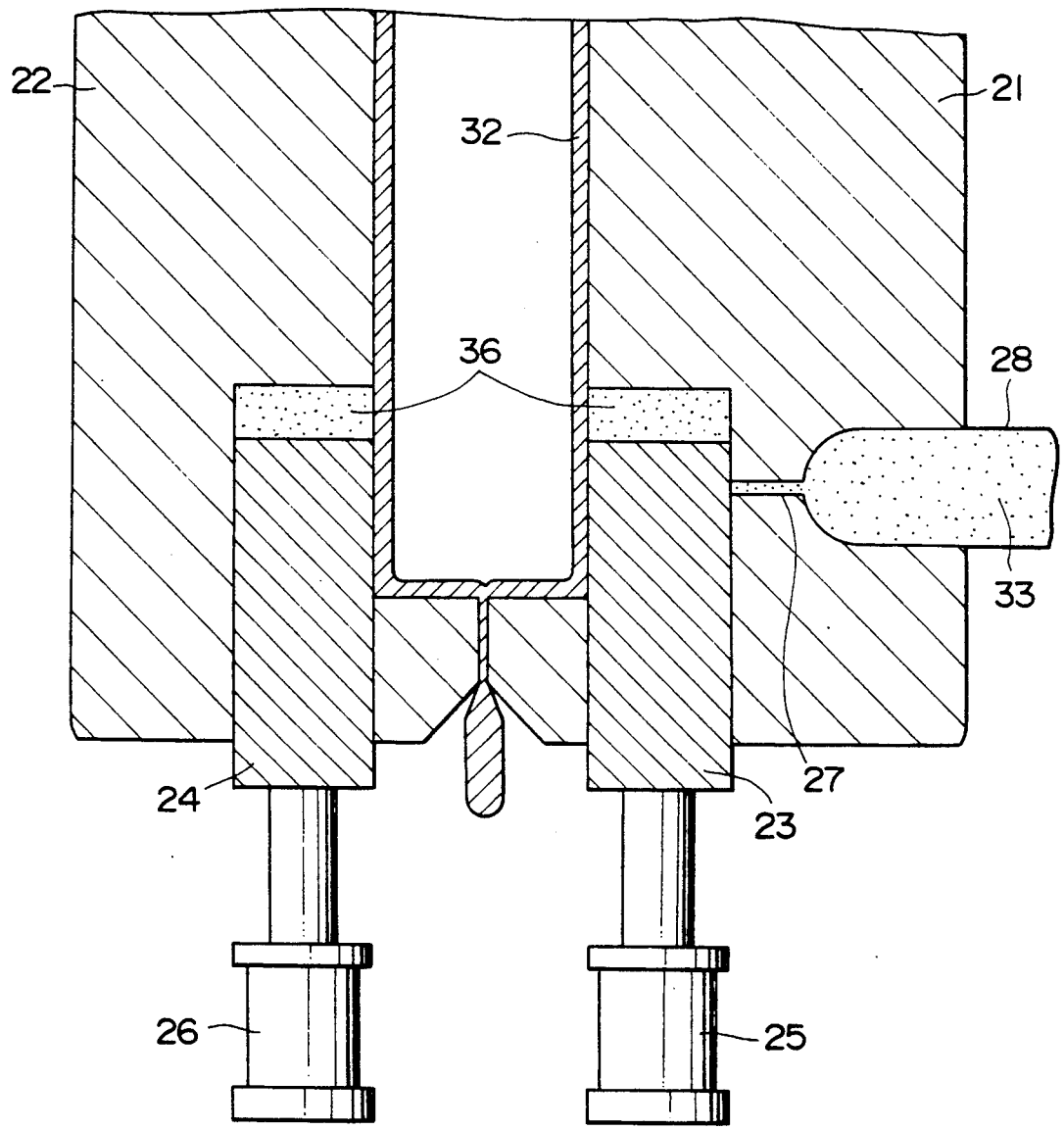

As shown in FIG. 4d, a second molten plastic material 33 is supplied into the second mold cavity 34. The second plastic material which has been supplied into the second mold cavity 34 is indicated by numeral 35. After having supplied a desired amount or second plastic material 35 into the second mold cavity 34, the supply of second plastic material 33 is stopped and then the cylinder actuators 25 and 26 are again energized to move the slidable mold segments 23 and 24 to their predetermined shaping position as shown in FIG. 4e. As a result, the second mold cavity 34 becomes smaller in volume and the second plastic material 35 inside the second mold cavity 34 becomes pressurized to form a flange 36. This predetermined shaping position is set at a position between the advanced and retracted positions and preferably above a location where the supply port 27 communicates with the second mold cavity 34. In this case, if the pressing force applied to the second plastic material 35 is large enough so that it may cause deformation of the tubular portion 32 locally, the pressure of the gas inside the tubular portion 32 may be increased by introducing a pressurized gas at a higher pressure level into the interior of the tubular portion 32 through the pin 31.

Upon completion of shaping of the second plastic material 36 into a desired shape (a flange in this example) by a press forming method as described above and shown in FIG. 4e, both of the tubular and flange portions 32 and 36 are cooled until they are sufficiently hardened. Then, the mold halves 21 and 22 are separated from each other to their open positions as shown in FIG. 4a and the resulting hollow plastic product including the tubular portion 32 and the flange 36 is removed from the mold halves 21 and 22.

Figure 5A:
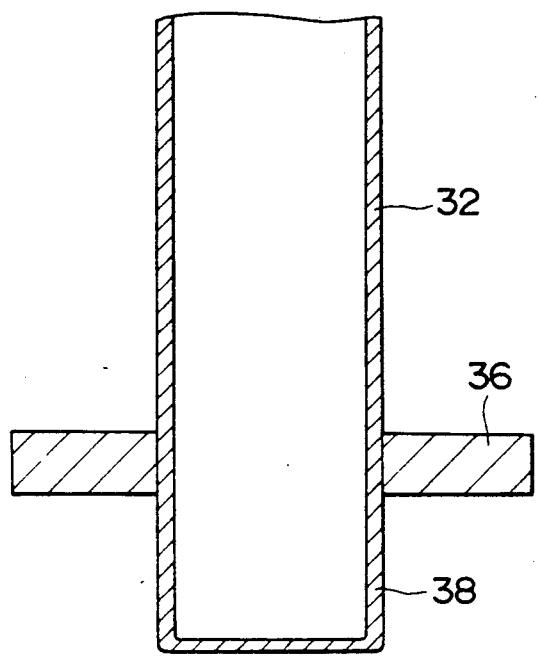
FIGS. 5a and 5b are schematic illustrations showing in cross sectional and perspective views, respectively, the resulting plastic product produced as a result of a sequence of steps illustrated in FIGS. 4a through 4e.
Figure 5B:
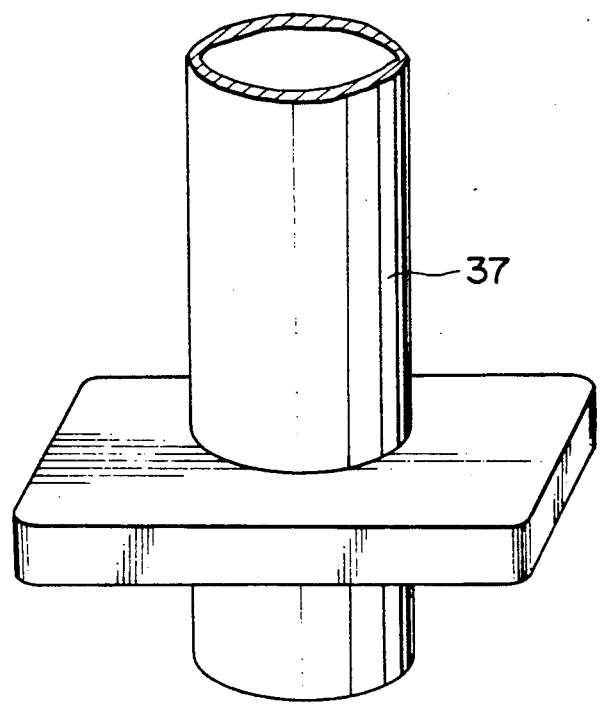

The resulting hollow plastic product removed from the mold halves 21 and 22 is still an intermediate product as shown in FIG. 5a in cross section and in FIG. 5b in perspective view. As shown, this hollow plastic product includes a tubular portion 32, a flange 36 and a cup-shaped portion 38. Since the cup-shaped portion 38 is not desired, the portion 38 is removed by cutting.

Figure 6A:
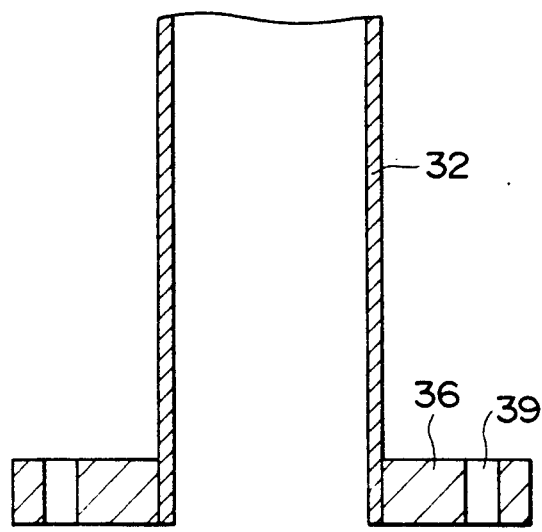
FIGS. 6a and 6b are schematic illustrations showing in cross sectional and perspective views, respectively, a finished hollow plastic product which can be obtained by applying a finishing operation to the structure shown in FIGS. 5a and 5b.
Figure 6B:
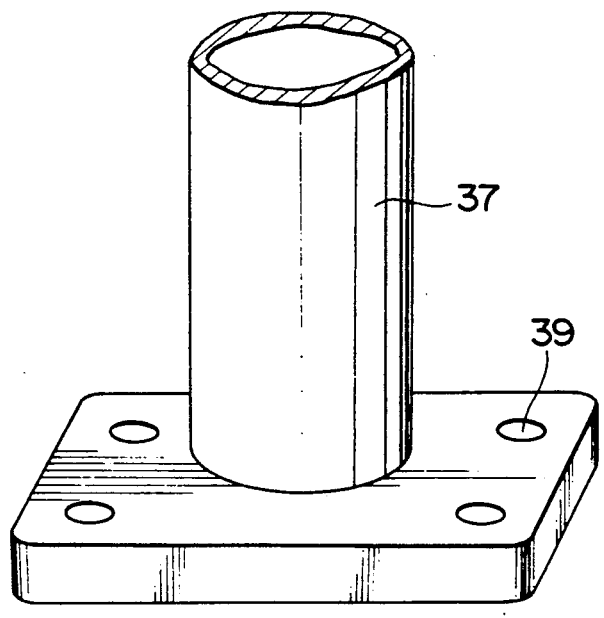

As shown in FIGS. 6a and 6b, the flange 36 is formed with a plurality of mounting holes 39 to provide a finished final hollow plastic product which includes a tubular portion 32 and a flange 36 provided with mounting holes 39. Therefore, as shown in FIGS. 6a and 6b, a hollow plastic product produced in accordance with a method of the present invention includes a hollow tubular portion 32 which has been formed by a blow molding method and a flange 36 which extends radially outwardly from the tubular portion 32 and which has been formed by a press forming method. Since the flange 36 is formed by a press forming method while the tubular portion 32 is still in the same mold, the flange 36 is integrated with the tubular portion 32 so that the bonding between the tubular portion 32 and the flange 36 is virtually as strong as that of a unitary structure.

FIG. 7 illustrates a modification of the apparatus used for a sequence of steps shown in FIGS. 4a through 4e. As shown in FIG. 7, in this modified apparatus, each of the slidable mold segments 23 and 24 is provided with a retractable solid pin 40 which is normally biased by a spring 43 toward its advanced position. When the slidable mold segments 23 and 24 are located at their advanced positions to occupy the full space of the second mold cavity, these pins 40 are retracted into holes formed in the respective slidable mold segments 23 and 24 against the recovery force of the springs 41. On the other hand, when the slidable mold segments 23 and 24 are located at their retracted positions as shown in FIG. 7, these pins 40 are located at their advanced positions by means of the springs 41. In this case, the pins 40 are located at the advanced position when their bottom heads 43 are in engagement with the top surface of the holes. Then, when the slidable mold segments 23 and 24 are moved to their predetermined shaping positions, the pins 40 are brought into abutment against the top surface of the second mold cavity and slightly moved back into the respective holes against the force of the springs 41.

In the structure shown in FIG. 7, use has been made of a spring 41 for normally biasing the corresponding pin 40 outwardly. However, use may be made of any other alternative element for this purpose and, for example, use may be made of a rubber or the like. In addition, it is not necessary that the pin 40 be biased normally outwardly, and, thus, use may also be made of a cylinder actuator, a cam mechanism or the like to control the position of the pin 40.

Figure 8A:
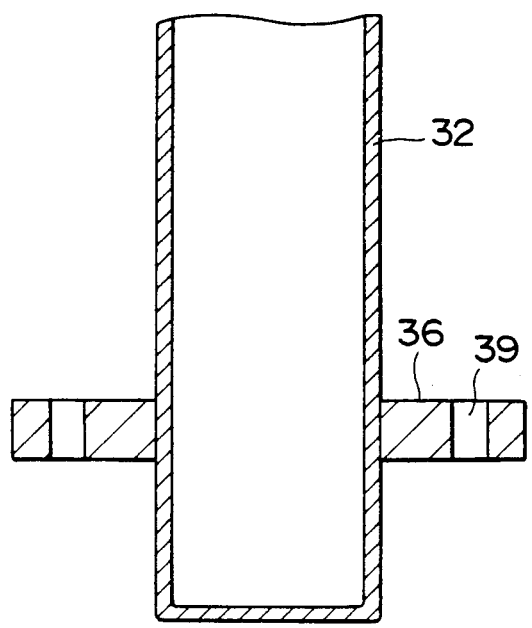
FIGS. 8a and 8b are schematic illustrations showing in cross sectional and perspective views, respectively, a hollow plastic product having a flange formed with mounting holes produced by using the apparatus shown in FIG. 7.
Figure 8B:
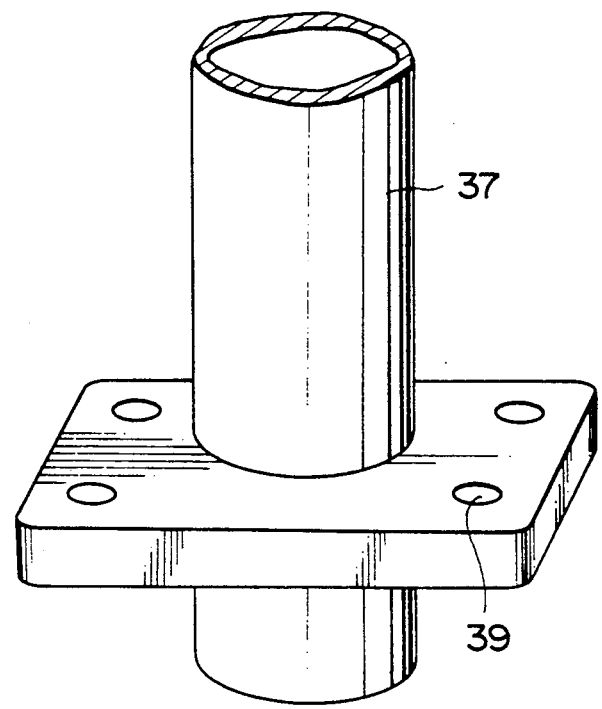

FIGS. 8a and 8b illustrate an intermediate hollow plastic product manufactured by using the modified apparatus shown in FIG. 7. As shown, since the pins 40 are provided in the apparatus shown in FIG. 7, the flange 36 is provided with mounting holes 39 when this intermediate product has been produced by the apparatus shown in FIG. 7. Thus, it is only necessary to remove the cup-shaped bottom portion by cutting so as to produce a final hollow plastic product from this intermediate product.

FIGS. 9a through 9d illustrate another modification of the apparatus for use in a method of the present invention. In this modified structure, a physically engaging structure is provided at a joint between a hollow portion produced by a blow molding method and a radially extending solid portion produced by a press forming method.

Figure 9A:
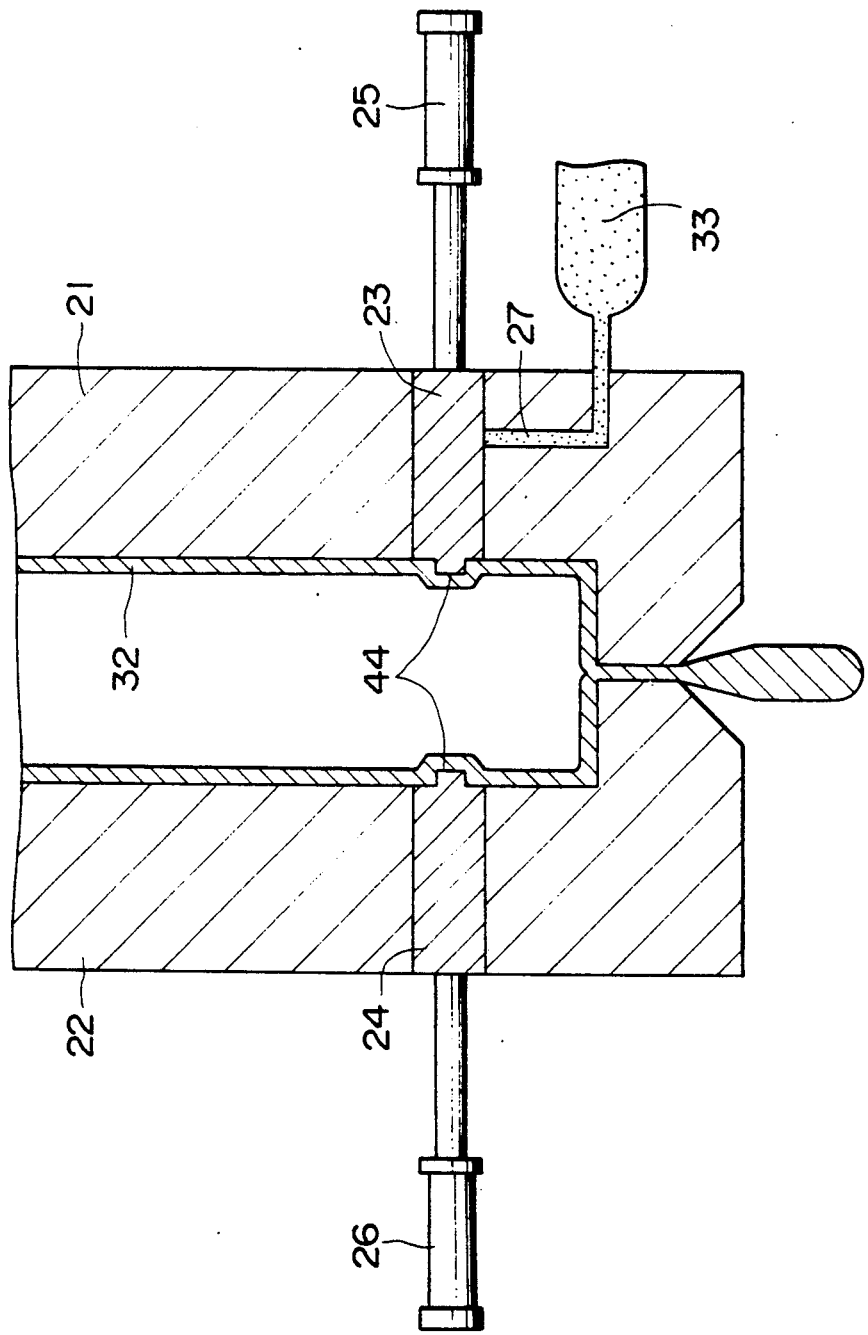

As shown in FIG. 9a, in this embodiment, the slidable mold segments 23 and 24, which together define the shape of a flange, are provided to be slidable horizontally in the respective mold halves 21 and 22. Each of the horizontally slidable mold segments 23 and 24 is provided with a projection 44 at a distal end surface. result, when a parison placed inside the first mold cavity defined by the grooves of the left and right mold halves 21 and 22 which have been brought into a mating condition is inflated, a tubular portion 32 is defined as being pressed against the surface of the first mold cavity. In this case, since the first mold cavity is partly defined by the projection 44 of the slidable mold segments 23 and 24, the tubular portion 32 has a commensurate shape corresponding to the projection 44.

After the tubular portion 32 has hardened sufficiently, the slidable mold segments 23 and 24 are moved to the retracted position by the associated cylinder actuators 25 and 26 so that a second mold cavity 34 is defined around and adjacent to a part of the outer peripheral surface of the tubular portion 32 and at a location where an inwardly projecting crocked shape is formed as shown in FIG. 9b. Then, as shown in FIG. 9c, a second plastic material 33 is supplied into the second mold cavity 34 via a supply port 27. When a predetermined amount of second plastic material 35 has been supplied into the second mold cavity 34 as shown in FIG. 9c, the cylinder actuators 25 and 26 are operated to move the mold segments 23 and 24 to their predetermined shaping position so that the second plastic material 35 is pressurized and shaped to define a flange 36 as shown in FIG. 9d. In this case, since a circumferential recess 44 is filled by a part of the second plastic material 35 which defines the flange 36, the resulting flange 36 is physically anchored to the tubular portion 32.

It is to be noted that in the above-described embodiment shown in FIGS. 9a through 9d, each of the slidable mold segments 23 and 24 is provided with a projection to define a physically engaging structure at a junction between the tubular portion 32 and the flange 36. However, such a physically engaging structure may be defined by any other shapes. For example, a recess may be provided to each of the slidable mold segments 23 and 24 instead of a projection, in which case, the tubular portion 32 will be formed with an outwardly extending ridge in a circumferential direction which engages with a recess formed in the flange 36 at its junction.

As described above, in accordance with the present invention, since the hollow portion and the radially extending solid portion are produced at different steps of a sequence, different plastic materials may be used for these different portions. On the other hand, the same plastic material can be used for both of the hollow and radially extending solid portions. The plastic materials which can be advantageously used for the purpose of the present invention include: nylon 6, nylon 6-6, nylon 6 or 6-6 (containing glass fibers by 30%), nylon 4-6, nylon 6-10, nylon 6-12, nylon family alloys, PPS (polyphenylene sulfide), PET (polyethylene terephthalate), PBT (polybutylene teraphthalate), PES (polyether sulfone), PEEK (polyetheretherketone), polyimide, polyamideimide and polyolefin (such as polyethylene and polypropylene).

In the case where a smooth inner surface is desired for the tubular portion and a sufficient rigidity is desired for the radially extending portion, the tubular portion may be formed, for example, from nylon 6 and the radially extending portion may be formed, for example, from nylon 6 containing a desired amount of reinforcing elements, such as glass fibers. In this case, the tubular portion is used for guiding a flow of gas and thus the inner surface of the tubular portion is desired to be as smooth as possible. On the other hand, the radially extending portion, such as a flange or bracket, is used for mounting and thus it is desired to be rigid and strong.

Figure 10A:
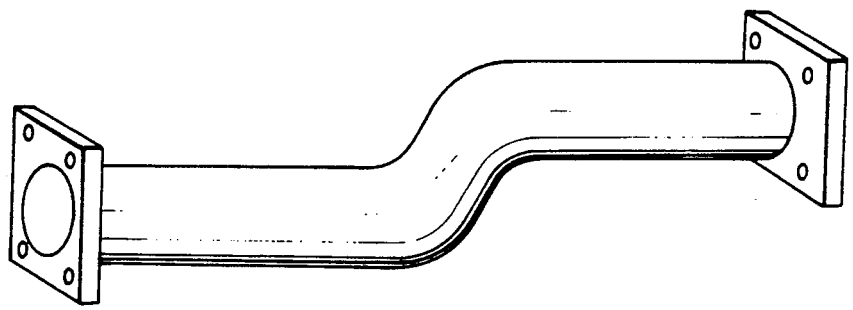
FIGS. 10a through 10c are schematic illustrations showing in perspective view several examples of a hollow plastic product having a radially extending portion which can be produced by the method of the present invention.
Figure 10B:
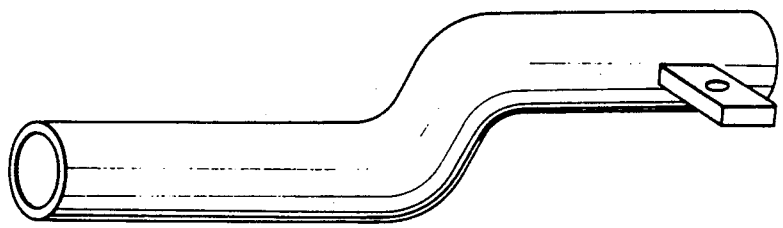
Figure 10C:
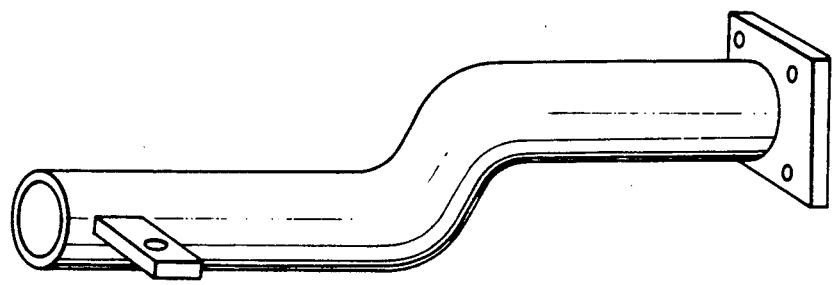

FIGS. 10a through 10c illustrate a few examples of a hollow plastic product which can be advantageously manufactured by a method of the present invention. FIG. 10a illustrates a hollow plastic product including a duct, whose center axis is bent two or three dimensionally, as a tubular portion and a flange as a radially extending portion at each end of the duct. FIG. 10b illustrates a hollow plastic product including a duct, whose center axis is also bent two or three dimensionally, as a tubular portion and a bracket as a radially extending portion near the right-hand end of the tubular portion. FIG. 10c illustrates a hollow plastic product including a duct, whose center axis is also bent two or three dimensionally, as a tubular portion and a flange as a radially extending portion at the right-hand end of the tubular portion and a bracket as another radially extending portion near the left-hand end of the tubular portion.

It should also be noted that in all of the examples shown in FIGS. 10a through 10c, the hollow plastic product includes a hollow portion and a radially extending portion which is solid and not hollow. However, the tubular portion may include a solid portion at least partly and the radially extending portion may be hollow at least partly. In addition, the radially extending portion may take shapes other than a flange and a bracket, if desired.

As described in detail above, in accordance with the present invention, a hollow plastic product having a radially extending portion high in structural integrity and mechanical strength can be provided. Such a product can be provided at high efficiency and with ease. In particular, in accordance with a preferred embodiment of the present invention, since a tubular portion is manufactured by a blow molding method and a radially extending portion is manufactured by a press forming method, the tubular portion can be designed to take any desired shape depending on the application and the radially extending portion can be made as strong and rigid as possible. In addition, since the blow molding process and the press forming process are carried out in sequence using the same mold, the entire sequence can be carried out very effectively and efficiently. A hollow plastic product resulting from the present method has a high air-tight and sealing characteristic, so that it can be used under a constantly vibrating condition, such as an automobile, and, in particular, its engine room. In addition, the present hollow plastic product can be used as a duct for guiding a flow of a gas and liquid, such as water and oil.

While the above provides a full and complete disclosure of the preferred embodiments of the present invention, various modifications, alternate constructions and equivalents may be employed without departing from the true spirit and scope of the invention, which is defined by the appended claims.

What is claimed is:

1. A method for producing a plastic product having an axially extending portion and a radially extending portion, comprising the steps of:
    (a) placing a parison of a first plastic material in a first mold cavity defined by bringing into contact a plurality of mold sections, at least one of which includes a movable mold segment at a first predetermined position;
    (b) introducing a pressurized gas into the interior of said parison to blow mold said parison to thereby form said axially extending portion;
    (c) moving said movable mold segment to a second predetermined position to define a second mold cavity adjacent to a part of an outer peripheral surface of said axially extending portion;
    (d) supplying a predetermined amount of a second plastic material into said second mold cavity; and
    (e) moving said movable mold segment to a third predetermined position to thereby have said second plastic material in said second mold cavity pressurized to thereby form said radially extending portion, said radially extending portion being integrated with said axially extending portion.

2. The method of claim 1, wherein said axially extending portion is hollow at least partly and said radially extending portion is solid at least partly.

3. The method of claim 1, wherein during the step (e), a pressurized gas is introduced into the interior of said axially extending portion so as to prevent said axially extending portion from being deformed locally.

4. The method of claim 1, wherein said movable mold segment is movable generally in parallel with a longitudinal axis of said axially extending portion.

5. The method of claim 1, wherein said movable mold segment is movable generally perpendicularly with respect to a longitudinal axis of said axially extending portion.

6. The method of claim 5, wherein said movable mold segment is provided with a profiled end surface which defines a part of said first mold cavity so that a physically engaging structure can be provided at a junction between said axially and radially extending portions.

7. The method of claim 1, wherein said movable mold segment is provided with a retractable pin which may project into said second mold cavity so that a mounting hole is formed in said radially extending portion simultaneously when said radially extending portion is formed by said step (e).

8. The method of claim 1, wherein said axially extending portion is a tubular portion and said radially extending portion is a solid portion.

9. The method of claim 8, wherein said tubular portion is straight or bent two dimensionally or three dimensionally.

10. The method of claim 8, wherein said solid portion is in the form of a flange at at least one end of said tubular portion.

11. The method of claim 8, wherein said solid portion is in the form of a bracket.

* * * * *